US007702344B2

(12) United States Patent
Moon et al.

(10) Patent No.: US 7,702,344 B2
(45) Date of Patent: Apr. 20, 2010

(54) RADIO COMMUNICATION SYSTEM, MOBILE STATION, BASE STATION AND RADIO NETWORK CONTROLLER

(75) Inventors: Sung Uk Moon, Yokosuka (JP); Takehiro Nakamura, Yokosuka (JP); Minami Ishii, Yokohama (JP); Shinji Ueda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 942 days.

(21) Appl. No.: 10/663,839

(22) Filed: Sep. 17, 2003

(65) Prior Publication Data
US 2004/0092288 A1 May 13, 2004

(30) Foreign Application Priority Data
Sep. 19, 2002 (JP) ............................. 2002-274144
Mar. 27, 2003 (JP) ............................. 2003-089240

(51) Int. Cl.
*H04B 15/00* (2006.01)
*H04B 7/00* (2006.01)
*H04W 4/00* (2009.01)

(52) U.S. Cl. .................. 455/503; 455/518; 455/526; 455/463

(58) Field of Classification Search ................ 455/463, 455/526, 133, 134, 503, 561, 518, 519
See application file for complete search history.

(56) References Cited

U.S. PATENT DOCUMENTS

| 4,524,276 | A |   | 6/1985  | Ohtombe |          |
|-----------|---|---|---------|---------|----------|
| 5,530,437 | A |   | 6/1996  | Goldberg |         |
| 6,023,626 | A | * | 2/2000  | Kinnunen et al. | ........... 455/512 |
| 6,122,483 | A | * | 9/2000  | Lo et al. | .................... 455/12.1 |
| 6,128,472 | A | * | 10/2000 | Harel et al. | ................ 340/7.21 |
| 6,477,149 | B1 | * | 11/2002 | Okanoue | .................... 370/312 |
| 6,707,900 | B1 | * | 3/2004  | Jellema et al. | ......... 379/221.08 |
| 6,804,528 | B1 |   | 10/2004 | Laroia et al. |          |

(Continued)

FOREIGN PATENT DOCUMENTS

JP          04-013318          1/1992

(Continued)

OTHER PUBLICATIONS

3$^{rd}$ Generation Partnership Project; Technical Specification Group Terminals; Technical realization of Cell Broadcast Service (CBS); Release 1999; 3GPP TS 23.041 V3.3.0 (Oct. 2000) pp. 1-37.

(Continued)

*Primary Examiner*—Nay A Maung
*Assistant Examiner*—Andrew Wendell
(74) *Attorney, Agent, or Firm*—Oblon, Spivak, McClelland, Maier & Neustadt, L.L.P.

(57) ABSTRACT

A radio communication system includes a radio network controller, base stations and mobile stations. The mobile station includes a response signal transmitter which is configured to transmit a response signal including a group ID identifying a multicast group A to a base station. The response signal responds to a control signal for the multicast group A which the mobile station is joining in. The base station includes a response signal transmitter configured to transmit at least one response signal to the radio network controller. The response signal is selected from at least one response signal transmitted from the mobile station joining in the same multicast group A.

8 Claims, 12 Drawing Sheets

U.S. PATENT DOCUMENTS

| | | | |
|---|---|---|---|
| 7,149,195 B2 * | 12/2006 | Kall et al. | 370/328 |
| 7,403,793 B2 * | 7/2008 | Mauney et al. | 455/552.1 |
| 2002/0114302 A1 | 8/2002 | McDonald et al. | |
| 2002/0191567 A1 * | 12/2002 | Famolari et al. | 370/335 |
| 2003/0022683 A1 * | 1/2003 | Beckmann et al. | 455/518 |
| 2006/0166653 A1 * | 7/2006 | Xu et al. | 455/412.2 |

FOREIGN PATENT DOCUMENTS

| | | |
|---|---|---|
| JP | 2001-308856 | 11/2001 |
| JP | 2002-124935 | 4/2002 |
| JP | 2002-232352 | 8/2002 |
| JP | 2002-237775 | 8/2002 |
| KR | 2002-0034977 | 5/2002 |
| WO | WO 95/24000 | 9/1995 |

OTHER PUBLICATIONS

3$^{rd}$ Generation Partnership Project; Technical Specification Group Radio Access Network; Broadcast/Multicast Control BMC (Release 1999); 3GPP TS 25.324 V3.3.0 (Dec. 2000) pp. 1-23.

* cited by examiner

RADIO COMMUNICATION SYSTEM, MOBILE STATION, BASE STATION AND RADIO NETWORK CONTROLLER

CROSS REFERENCE TO RELATED APPLICATION

This application is based upon and claims the benefit of priority from the prior Japanese Patent Application No. P2002-274144, filed on Sep. 19, 2002; and P2003-089240, filed on Mar. 27, 2003; the entire contents of which are incorporated herein by reference.

BACKGROUND OF THE INVENTION

1. Field of the Invention

The present invention relates to a radio communication system performing multicast communication, a mobile station, a base station and a radio network controller.

2. Description of the Related Art

As shown in FIG. 1, broadcast communication whereby a plurality of base stations 11 to 17 transmit common information to unspecified mobile stations 101 to 112 in predetermined areas is known in a conventional radio communication system.

As shown in FIG. 2, multicast communication whereby a plurality of base stations 11 to 17 transmit common information to specific mobile stations joining in (belonging to) a specific group is known in a conventional radio communication system.

However, there is a problem in that a plurality of mobile stations joining in a multicast group receive a controls signal for the multicast group at approximately the same time, and a plurality of response signals are transmitted to the radio network controller at approximately the same time, so that the load on receiving controlling and processing of the radio network controller is increased as the number of response signals increases in the conventional multicast communication.

BRIEF SUMMARY OF THE INVENTION

In viewing of the foregoing, it is an object of the present invention to provide a radio communication system which can reduce the load on the radio network controller during the multicast communication, a mobile station, a base station and a radio network controller which can be used in the above radio communication system.

A first aspect of the present invention is summarized as a radio communication system having a radio network controller, base stations and mobile stations, to perform multicast communication.

The mobile station comprises a response signal transmitter configured to transmit a response signal including a group ID identifying a multicast group to the base station. The response signal responds to a control signal for the multicast group which the mobile station is joining in.

The base station comprises a response signal transmitter configured to transmit at least one response signal to the radio network controller. The at least one response signal is selected from at least one response signal transmitted from mobile stations joining in the same multicast group.

A second aspect of the present invention is summarized as a mobile station supporting multicast communication. The mobile station comprises a response signal transmitter configured to transmit a response signal including a group ID identifying a multicast group to a base station. The response signal responds to a control signal for the multicast group which the mobile station is joining in.

A third aspect of the present invention is summarized as a base station supporting multicast communication. The base station comprises a response signal transmitter configured to transmit at least one response signal to the radio network controller. The at least one response signal responds to a control signal for a multicast group, and is selected from at least one response signal transmitted from mobile stations joining in the same multicast group.

In the third aspect, the base station may further comprise a response signal holder configured to hold the at least one response signal for a predetermined duration before transmitting the at least one response signal to the radio network controller.

In the third aspect, the base station may further comprise a detector configured to detect a first reception of the at least one response signal transmitted from the mobile stations. The response signal holder may hold the at least one response signal for a predetermined duration after the first reception of the at lease one response signal.

A fourth aspect of the present invention is summarized as a radio communication system having a radio network controller, base stations and mobile stations, to perform multicast communication.

The mobile station comprises a response signal transmitter configured to transmit a response signal including a group ID identifying a multicast group to the base station. The response signal responds to a control signal for the multicast group which the mobile station is joining in.

The base station comprises a response signal counter configured to count the number of response signals transmitted from the mobile station joining in the same multicast group, a judger configured to judge whether the counted number of response signals is more than a predetermined number or not, and a response signal transmitter configured to transmit at least one response signal to the radio network controller when the counted number of response signals is more than the predetermined number.

A fifth aspect of the present invention is summarized as a base station supporting multicast communication. The base station comprises a response signal counter, a judger and a response signal transmitter.

The response signal counter is configured to count the number of response signals to a control signal for a multicast group. The response signals are transmitted from mobile stations joining in the same multicast group.

The judger is configured to judge whether the counted number of response signals is more than a predetermined number or not.

The response signal transmitter is configured to transmit at least one response signal to a radio network controller, when the counted number of response signals is more than the predetermined number.

In the fifth aspect, the response signal transmitter may notify that the counted number of response signals is more than the predetermined number, or the counted number of response signals, to the radio network controller.

A sixth aspect of the present invention is summarized as a radio network controller supporting multicast communication. The radio network controller comprises a receiver configured to receive response signals transmitted from base stations, a extractor configured to extract information showing that the number of received response signals is more than a predetermined number from the received response signals and a radio controller configured to perform a radio controlling in multicast communication in accordance with the extracted information.

A seventh aspect of the present invention is summarized as a radio network controller supporting multicast communication. The radio network controller comprises a receiver configured to receive response signals transmitted from base stations, a extractor configured to extract the number of received response signals from the received response signals and a radio controller configured to perform a radio controlling in multicast communication in accordance with the extracted number of response signals.

DETAILED DESCRIPTION OF THE INVENTION

Figure 1:
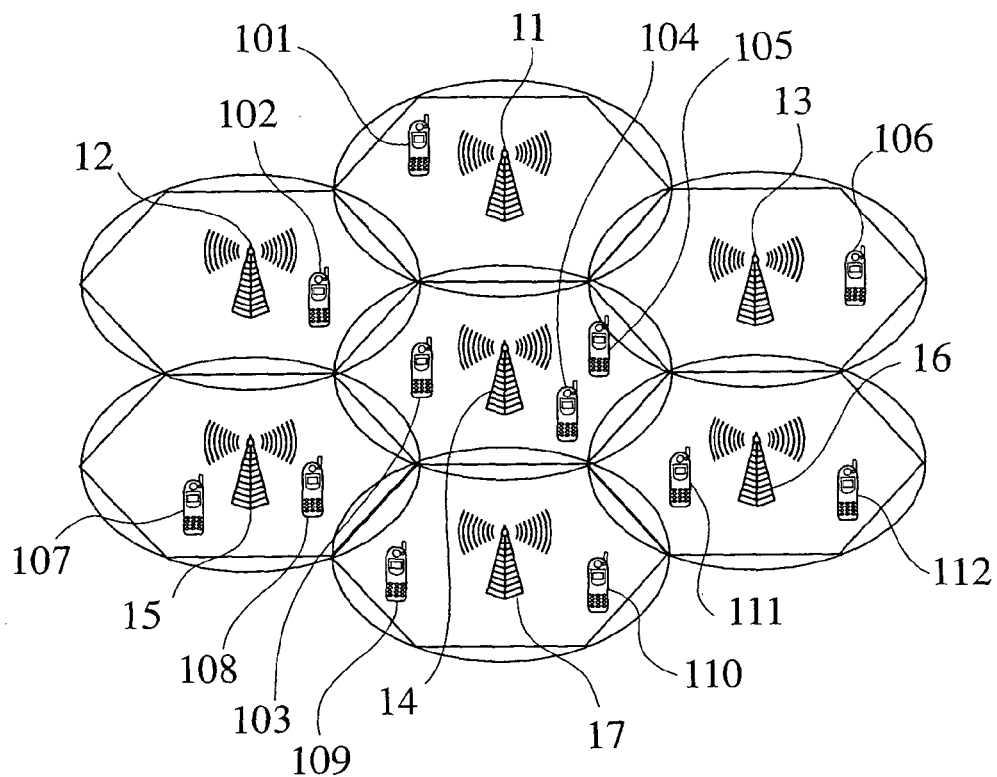
FIG. 1 is a diagram for explaining broadcast communication according to the prior art.
Figure 2:
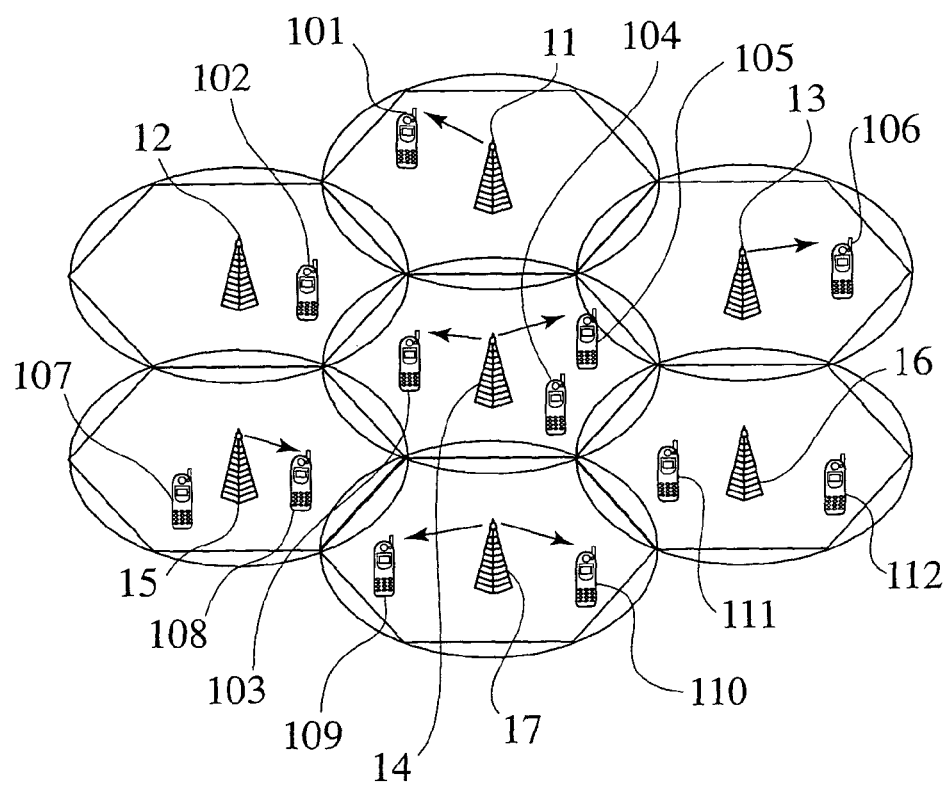
FIG. 2 is a diagram for explaining multicast communication according to the prior art.
Figure 3:
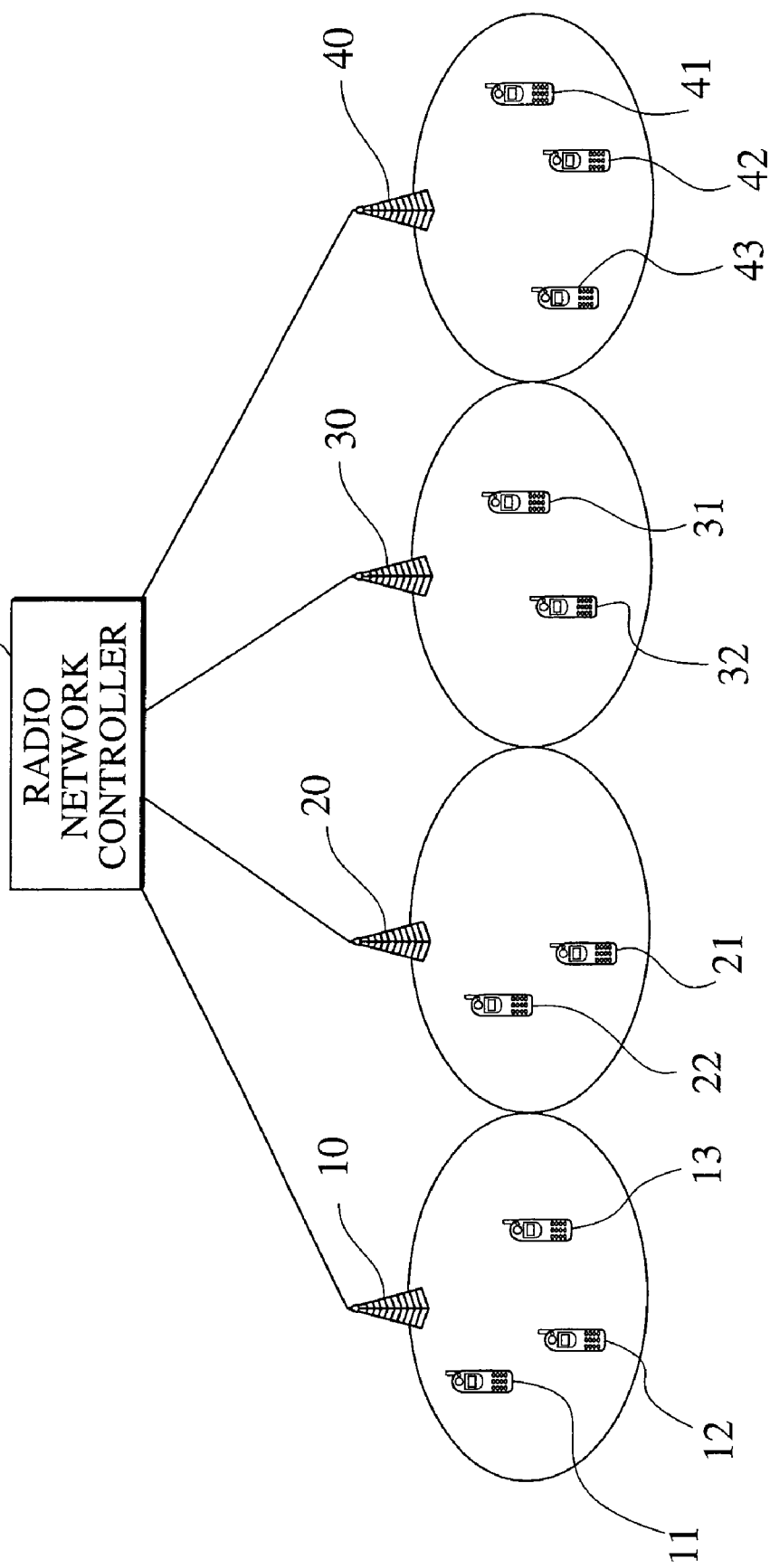
FIG. 3 is a diagram showing the entire configuration of a radio communication system according to embodiments of the present invention.

A Configuration of a Radio Communication System According to a First Embodiment of the Present Invention FIG. 3 shows the entire configuration of a radio communication system according to a first embodiment of the present invention.

As shown in FIG. 3, the radio communication system according to the embodiment comprises four base stations 10, 20, 30 and 40 under a radio network controller 50.

In the radio communication system according to the embodiment, the base station 10 manages mobile stations 11 to 13, the base station 20 manages mobile stations 21 and 22, the base station 30 manages mobile stations 31 and 32, and the base station 40 manages mobile stations 41 to 43. The mobile stations 11, 12, 21, 41, 42 and 43 join in the same multicast group A in the embodiment.

Figure 4:
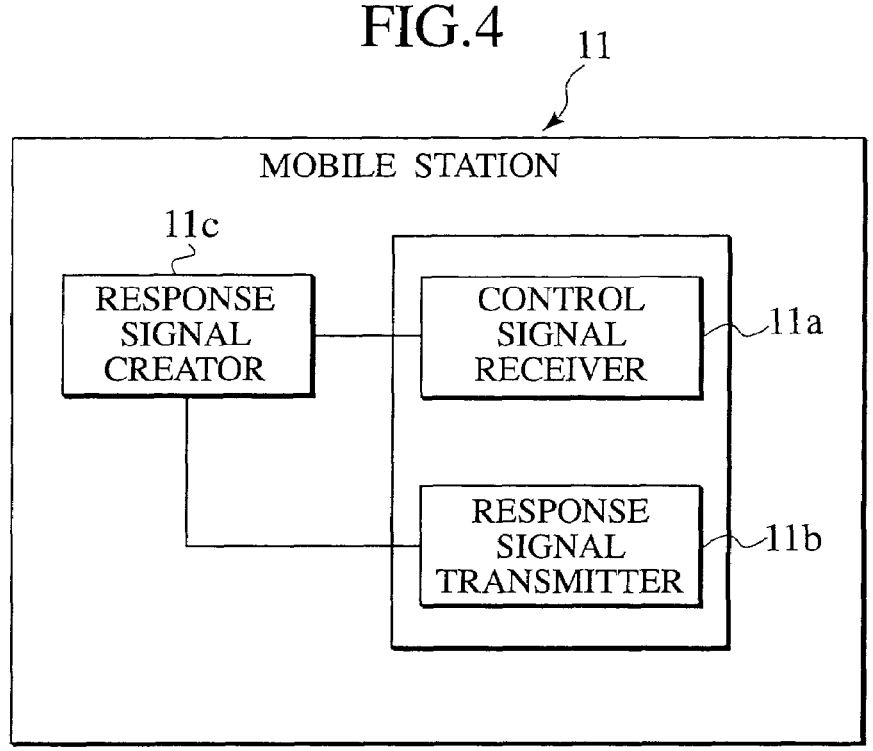
FIG. 4 is a functional block diagram of a mobile station in the radio communication system according to a first embodiment.

FIG. 4 shows a functional block diagram of the mobile station used in the radio communication system according to the embodiment. Functions of a plurality of mobile stations 11 to 43 are basically the same, so that the function of the mobile station 11 will be explained as follows.

As shown in FIG. 4, the mobile station 11 is configured with a control signal receiver 11a, a response signal transmitter 11b and a response signal creator 11c. The mobile station 11 can support multicast communication.

The control signal receiver 11a is configured to receive a control signal for the multicast group A. The control signal for the multicast group A is transmitted from the base station 10.

The response signal creator 11c is configured to create a response signal to the control signal for the multicast group A. The response signal includes a group ID identifying a multicast group.

The response signal transmitter 11b is configured to transmit the response signal to the base station 10 after holding the response signal.

Figure 5:
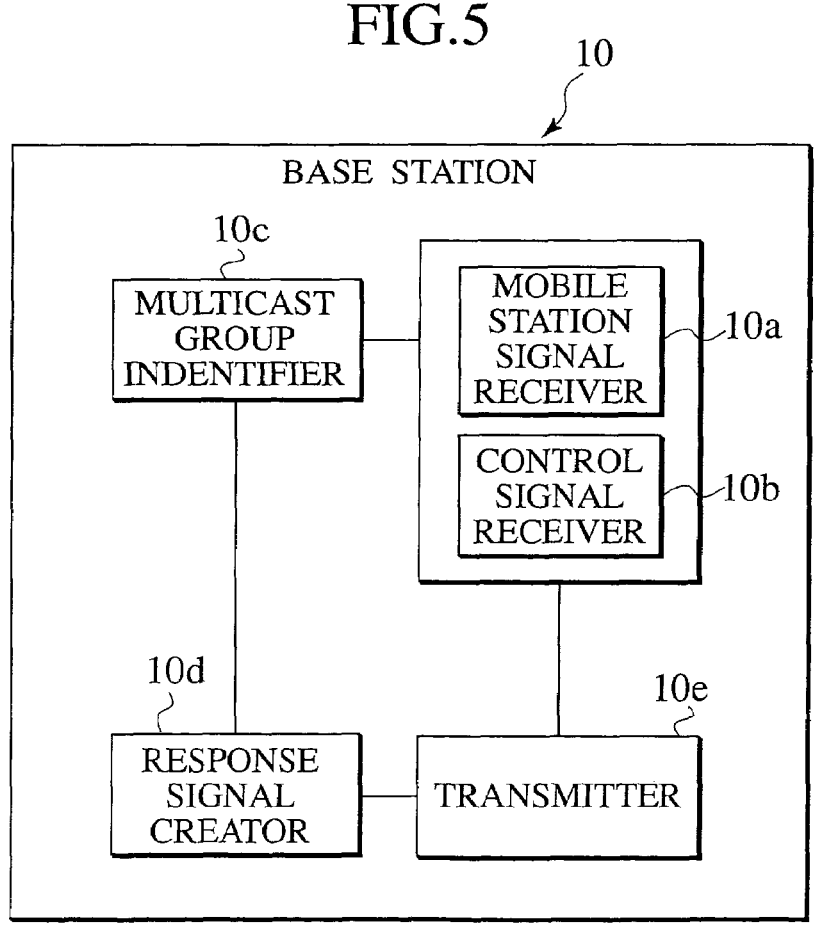
FIG. 5 is a functional block diagram of a base station in the radio communication system according to the first embodiment.

FIG. 5 shows a functional block diagram of the base station used in the radio communication system according to the embodiment. Functions of a plurality of base stations 10 to 40 are basically the same, so that the function of the base station 10 will be explained as follows.

As shown in FIG. 5, the base station 10 is configured with a mobile station signal receiver 10a, a control signal receiver 10b, a multicast group indentifier 10c, a response signal creator 10d and a transmitter 10e.

The mobile station signal receiver 10a is configured to receive at least one response signal from a plurality of mobile stations 11 to 13.

The control signal receiver 10b is configured to receive a control signal for a multicast group from the radio network controller 50.

The mobile station signal receiver 10a and the control signal receiver 10b may be configured with the same unit.

The multicast group indentifier 10c is configured to identify whether the received response signal is transmitted from the mobile station joining in the same multicast group.

The response signal creator 10d is configured to create at least one response signal (for example, a predetermined number of response signals) to be transmitted to the radio network controller 50, by extracting at least one response signal from at least one response signal transmitted from the mobile stations.

The response signal creator 10d may create at least one response signal to be transmitted to the radio network controller 50, by changing a format of the at least one response signal after extracting the at least one response signal from at least one response signal transmitted from the mobile stations.

The predetermined numbers (for example, one, two and so on) set up in each base station can be different.

The transmitter 10e is configured to transmit the control signal for the multicast group to the mobile station.

The transmitter 10e is configured to transmit the at least one response signal created by the response signal creator 10d to the radio network controller 50.

The transmitter 10e can transmit the control signal to the mobile stations after the expiration of a predetermined duration (for example, a random duration). The predetermined durations set up in each base station can be different.

<An Operation of the Radio Communication System According to the First Embodiment>

Figure 6:
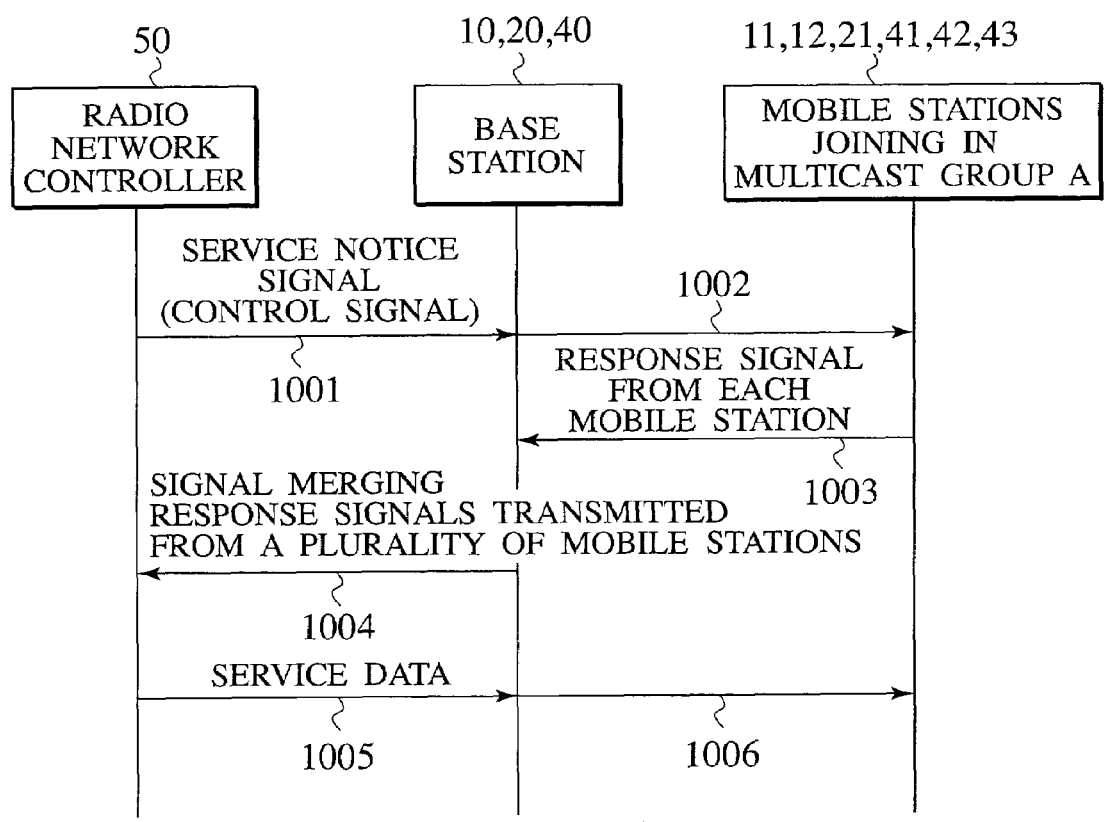
FIG. 6 is a sequence diagram illustrating the operation of the radio communication system according to the first embodiment.

Referring to FIG. 6, the operation whereby the radio network controller 50 performs a predetermined processing (for example, a service notice processing) on the mobile stations 11, 12, 21, 41, 42, 43 joining in the multicast group A in the radio communication system according to the embodiment will be described.

As shown in FIG. 6, in step 1001, the radio network controller 50 transmits a control signal such as a service notice signal and an authentication signal to three base stations 10, 20 and 40.

In step 1002, each of the base stations 10, 20 and 40 receives the control signal transmitted from the radio network controller 50. The control signals transmitted by each of the base stations 10, 20 and 40 reach the mobile stations 11, 12, 21, 41, 42 and 43 joining in the multicast group A under the base stations 10, 20 and 40.

In step 1003, each of the mobile stations 11, 12, 21, 41, 42 and 43 creates a response signal including a group ID. It is thus possible to identify that each of the mobile stations 11, 12, 21, 41, 42 and 43 is joining in the multicast group A with the group ID. Each of the mobile stations 11, 12, 21, 41, 42 and 43 respectively transmits the created response signal to the base stations 10, 20 and 40.

In step 1004, each of the base stations 10, 20 and 40 receives at least one response signal from each of the mobile stations 11, 12, 21, 41, 42 and 43, and identifies whether each of the response signals is transmitted from mobile stations joining in the same multicast group or not.

In the embodiment, each of the base stations 10, 20 and 40 identifies whether each of the response signals is transmitted from mobile stations joining in the multicast group A or not.

The base station 10 receives two response signals from the mobile stations 11 and 12 joining in the multicast group A. The base station 20 receives one response signal from the mobile stations 21 joining in the multicast group A. The base station 30 receives three response signals from the mobile stations 41, 42 and 43 joining in the multicast group A. In the base station 10, 20 and 40, six response signals are detected in total. The base station 30 does not receive any response signal from mobile stations 41, 42 and 43 joining in the multicast group A.

Next, each of the base stations 10, 20 and 40 selects at least one response signal (for example, two response signals) from at least one received response signal, and transmits the at least one selected response signal to the radio network controller 50. Each of the base stations 10, 20 and 40 may transmit a signal merging the at least one response signal transmitted from a plurality of mobile stations.

In the embodiment, the base station 10 selects at least one response signal transmitted from the mobile station 11 for transmission to the radio network controller 50, the base station 20 selects at least one response signal transmitted from the mobile station 21 for transmission to the radio network controller 50, the base station 40 selects at least one response signal transmitted from the mobile station 41 for transmission to the radio network controller 50.

In step 1005, the radio network controller 50 transmits service data to the base stations 10, 20 and 40 in accordance with the at least one response signal transmitted from each of the mobile stations 11, 21 and 41. In other words, the radio network controller 50 performs delivery controlling in accordance with the at least one response signal transmitted from each of the mobile stations 11, 21 and 41.

In step 1006, each of the base stations 10, 20 and 40 transmits the received service data to each of the mobile stations 11, 12, 21, 41, 42 and 43.

<Functions and Effects of the Radio Communication System According to the First Embodiment>

The radio communication system according to the first embodiment can reduce the load on the receiving processing and controlling performed by the radio network controller 50, by transmitting a signal merging a plurality of response signals (common information) into one (or a predetermined number) to the radio network controller 50, when control signals for a multicast group are received in a plurality of mobile stations at approximately the same time like multicast communication or broadcast communication, and the response signals increase.

<A Configuration of a Radio Communication System According to a Second Embodiment of the Present Invention>

Figure 7:
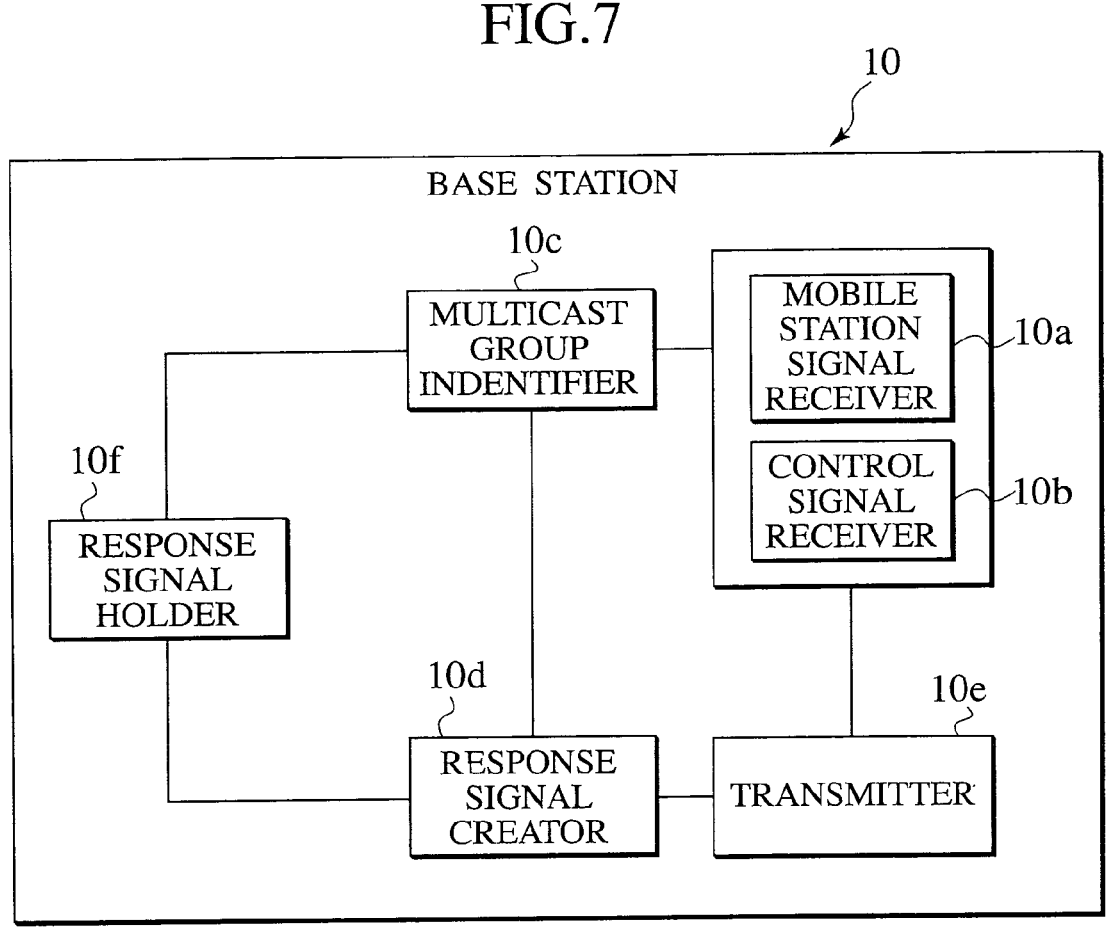
FIG. 7 is a functional block diagram of a base station in the radio communication system according to a second embodiment.

The present invention is not limited to the first embodiment, and can be applied to a radio communication system according to a second embodiment which further comprises a response signal holder 10f as shown in FIG. 7.

The radio communication system according to the second embodiment is the same as the radio communication system according to the first embodiment except for the response signal holder 10f. Therefore mainly the difference between both radio communication systems will be explained.

The response signal holder 10f is configured to hold the at least one response signal for a predetermined duration (for example, a random duration) before transmitting the at least one response signal to the radio network controller 50. The at least one response signal responds to the control signal for the multicast group A. The predetermined durations set up in each base station are different.

The response signal creator 10d is configured to create, in accordance with the at least one response signal held for the random duration by the response signal holder 10f, at least one response signal to be transmitted.

<An Operation of the Radio Communication System According to the Second Embodiment>

Figure 8:
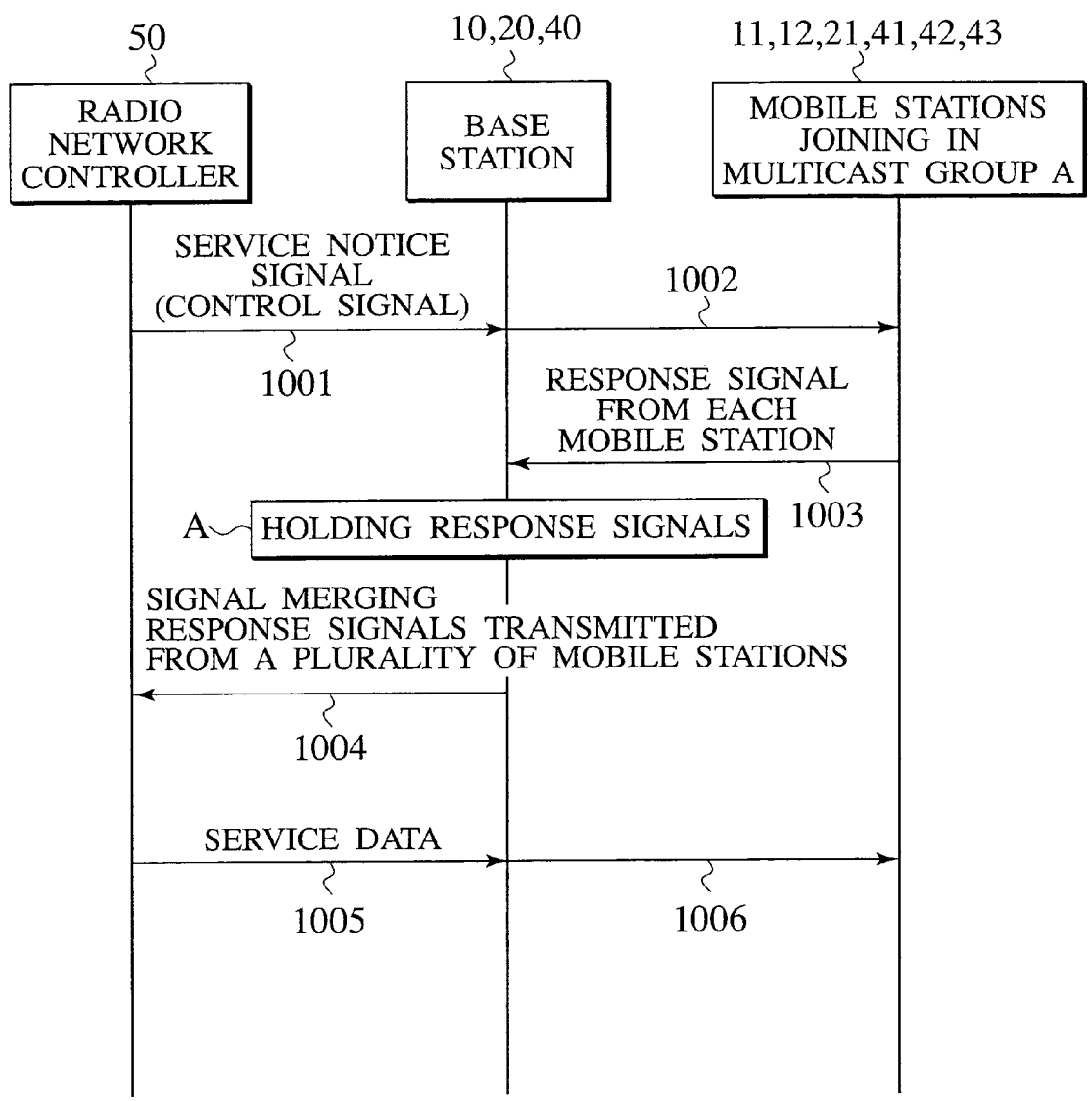
FIG. 8 is a sequence diagram illustrating the operation of the radio communication system according to the second embodiment.

Referring to FIG. 8, the operation whereby the radio network controller 50 performs a predetermined processing (for example, a service notice processing) on the mobile stations 11, 12, 21, 41, 42, 43 joining in the multicast group A in the radio communication system according to the embodiment will be described.

As shown in FIG. 8, in step 1001, the radio network controller 50 transmits a control signal such as a service notice signal and an authentication signal to three base stations 10, 20 and 40.

In step 1002, each of the base stations 10, 20 and 40 receives the control signal transmitted from the radio network controller 50. The control signals transmitted by each of the base stations 10, 20 and 40 reach the mobile stations 11, 12, 21, 41, 42 and 43 joining in the multicast group A under the base stations 10, 20 and 40.

In step 1003, each of the mobile stations 11, 12, 21, 41, 42 and 43 creates a response signal including a group ID. It is thus possible to identify that each of the mobile stations 11, 12, 21, 41, 42 and 43 is joining in the multicast group A with the group ID. Each of the mobile stations 11, 12, 21, 41, 42 and 43 respectively transmits the created response signal to the base stations 10, 20 and 40.

In step A, each of the base stations 10, 20 and 40 holds at least one response signal received from each of the mobile stations 11, 12, 21, 41, 42 and 43 for a predetermined duration.

In step 1004, each of the base stations 10, 20 and 40 selects at least one response signal from at least one response signal which is being held for the predetermined duration, and transmits the at least one selected response signal to the radio network controller 50 respectively.

In the embodiment, the base station 10 selects at least one response signal transmitted from the mobile station 11 for transmission to the radio network controller 50, the base station 20 selects at least one response signal transmitted from the mobile station 21 for transmission to the radio network controller 50, the base station 40 selects at least one response signal transmitted from the mobile station 41 for transmission to the radio network controller 50.

In step 1005, the radio network controller 50 transmits service data to the base stations 10, 20 and 40 in accordance with the at least one response signal transmitted from each of the mobile stations 11, 21 and 41. In other words, the radio network controller 50 performs delivery controlling in accordance with the at least one response signal transmitted from each of the mobile stations 11, 21 and 41.

In step 1006, each of the base stations 10, 20 and 40 transmits the received service data to each of the mobile stations 11, 12, 21, 41, 42 and 43.

<A Configuration of a Radio Communication System According to a Third Embodiment of the Present Invention>

Figure 9:
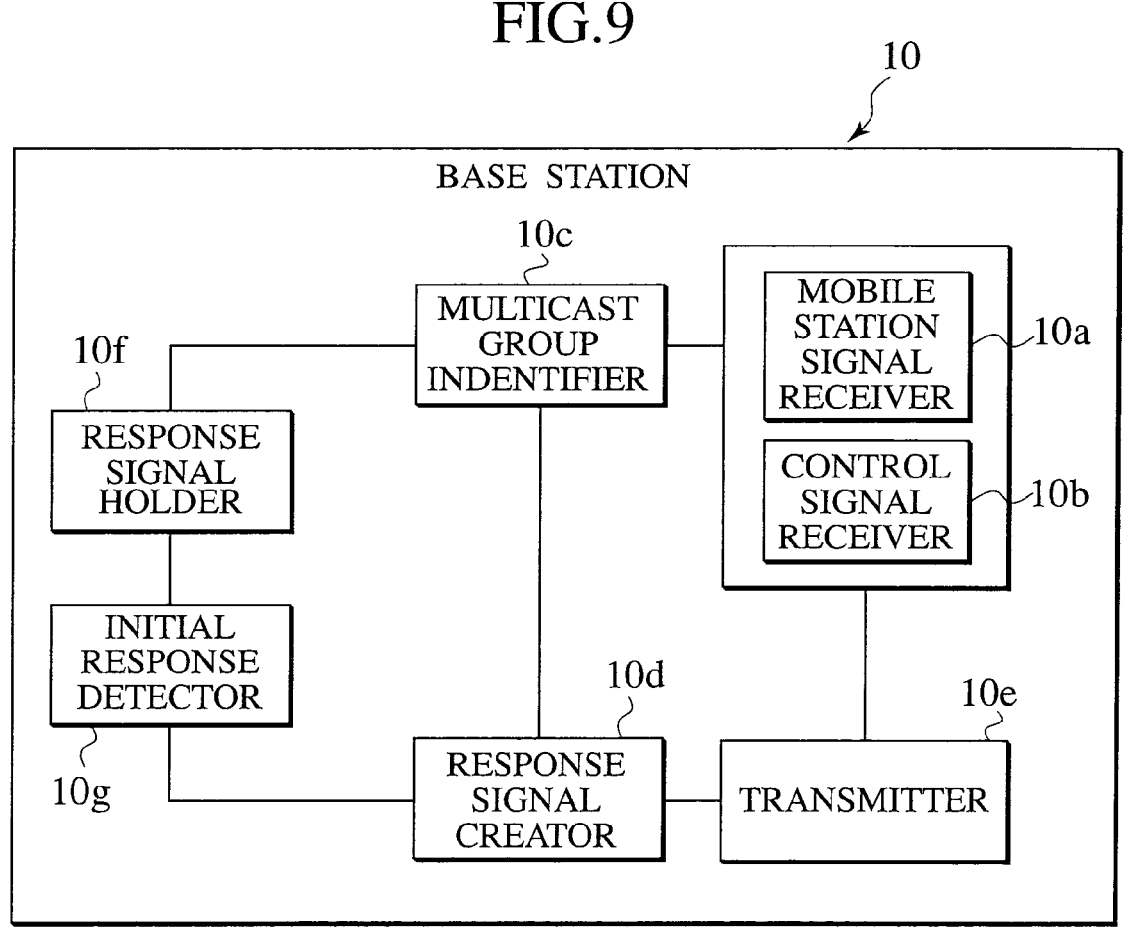
FIG. 9 is a functional block diagram of a base station in the radio communication system according to a third embodiment.

The present invention is not limited to the above embodiments, and can be applied to a radio communication system according to a third embodiment which further comprises a response signal holder 10*f* and an initial response detector 10*g* as shown in FIG. 9.

The radio communication system according to the third embodiment is the same as the radio communication system according to the first embodiment except for the response signal holder 10*f* and the initial response detector 10*g*. Therefore mainly the difference between both radio communication systems will be explained.

The initial response detector 10*g* is configured to detect a first reception of at least one response signal received from each of the mobile stations 11, 12, 21, 41, 42 and 43 joining in the multicast group A.

In the embodiment, the response signal holder 10*f* holds the at least one received response signal for a predetermined duration (for example, a random duration) after the first reception of the at least one response signal.

The response signal creator 10*d* creates, in accordance with the at least one response signal which is being held for the random duration by the response signal holder 10*f*, at least one response signal to be transmitted to the radio network controller 50.

<An Operation of the Radio Communication System According to the Third Embodiment>

Figure 10:
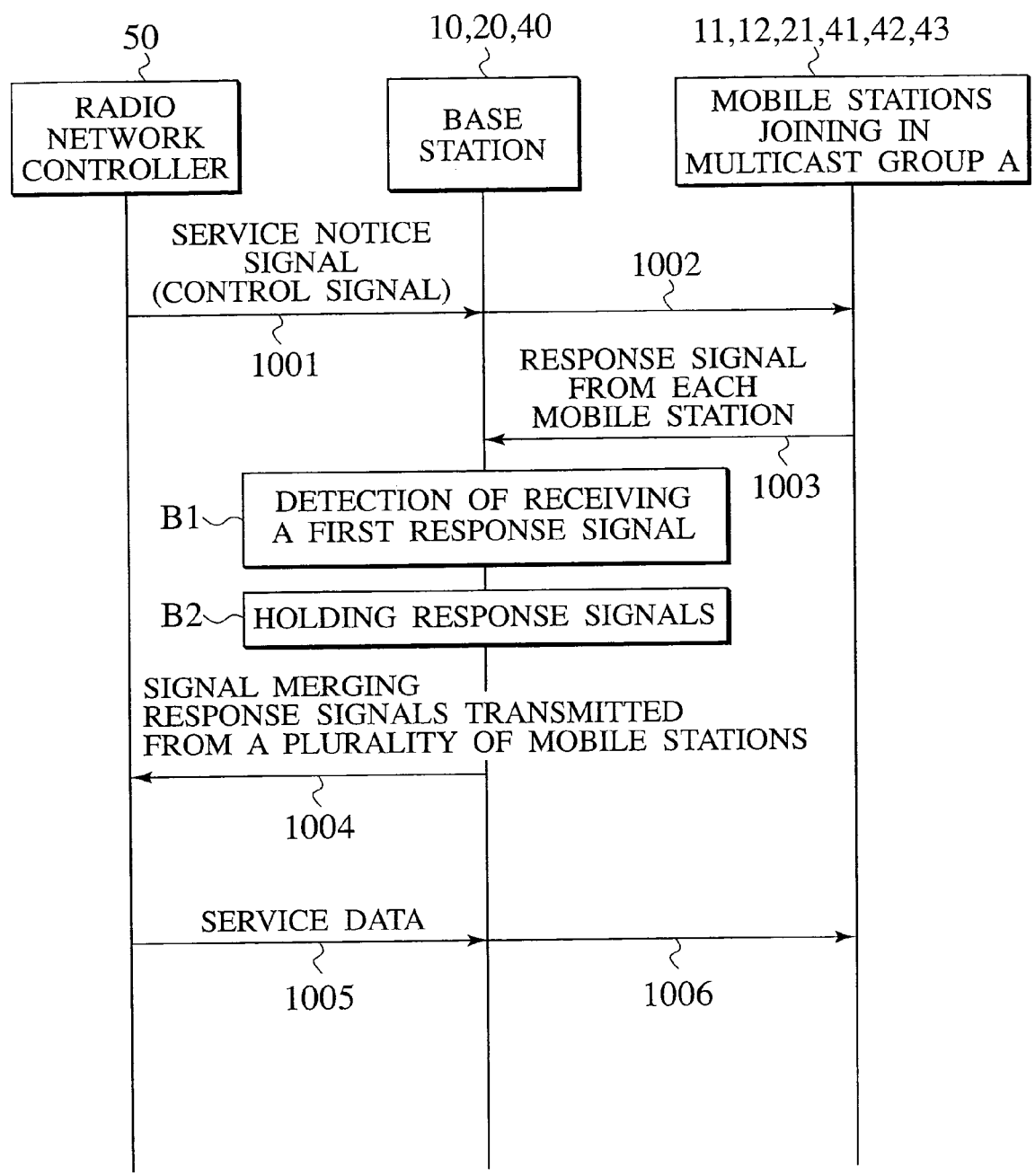
FIG. 10 is a sequence diagram illustrating the operation of the radio communication system according to the third embodiment.

Referring to FIG. 10, the operation whereby the radio network controller 50 performs a predetermined processing (for example, a service notice processing) on the mobile stations 11, 12, 21, 41, 42, 43 joining in the multicast group A in the radio communication system according to the embodiment will be described.

As shown in FIG. 10, in step 1001, the radio network controller 50 transmits a control signal such as a service notice signal and an authentication signal to three base stations 10, 20 and 40.

In step 1002, each of the base stations 10, 20 and 40 receives the control signal transmitted from the radio network controller 50. The control signals transmitted by each of the base stations 10, 20 and 40 reach the mobile stations 11, 12, 21, 41, 42 and 43 joining in the multicast group A under the base stations 10, 20 and 40.

In step 1003, each of the mobile stations 11, 12, 21, 41, 42 and 43 creates a response signal including a group ID. It is thus possible to identify that each of the mobile stations 11, 12, 21, 41, 42 and 43 is joining in the multicast group A with the group ID. Each of the mobile stations 11, 12, 21, 41, 42 and 43 respectively transmits the created response signal to the base stations 10, 20 and 40.

In step B1, each of the base stations 10, 20 and 40 detects a first reception of at least one response signal received from each of the mobile stations 11, 12, 21, 41, 42 and 43 joining in the multicast group A.

In step B2, each of the base stations 10, 20 and 40 holds the at least one response signal which is received from each of the mobile stations 11, 12, 21, 41, 42 and 43 after the first reception for a predetermined duration after the first reception.

In step 1004, each of the base stations 10, 20 and 40 selects at least one response signal from at least one response signal which is being held for the predetermined duration after the first reception, and transmits the at least one selected response signal to the radio network controller 50 respectively.

In the embodiment, the base station 10 selects at least one response signal transmitted from the mobile station 11 for transmission to the radio network controller 50, the base station 20 selects at least one response signal transmitted from the mobile station 21 for transmission to the radio network controller 50, the base station 40 selects at least one response signal transmitted from the mobile station 41 for transmission to the radio network controller 50.

In step 1005, the radio network controller 50 transmits service data to the base stations 10, 20 and 40 in accordance with the at least one response signal transmitted from each of the mobile stations 11, 21 and 41. In other words, the radio network controller 50 performs delivery controlling in accordance with the at least one response signal transmitted from each of the mobile stations 11, 21 and 41.

In step 1006, each of the base stations 10, 20 and 40 transmits the received service data to each of the mobile stations 11, 12, 21, 41, 42 and 43.

<A Configuration of a Radio Communication System According to a Fourth Embodiment of the Present Invention>

Figure 11:
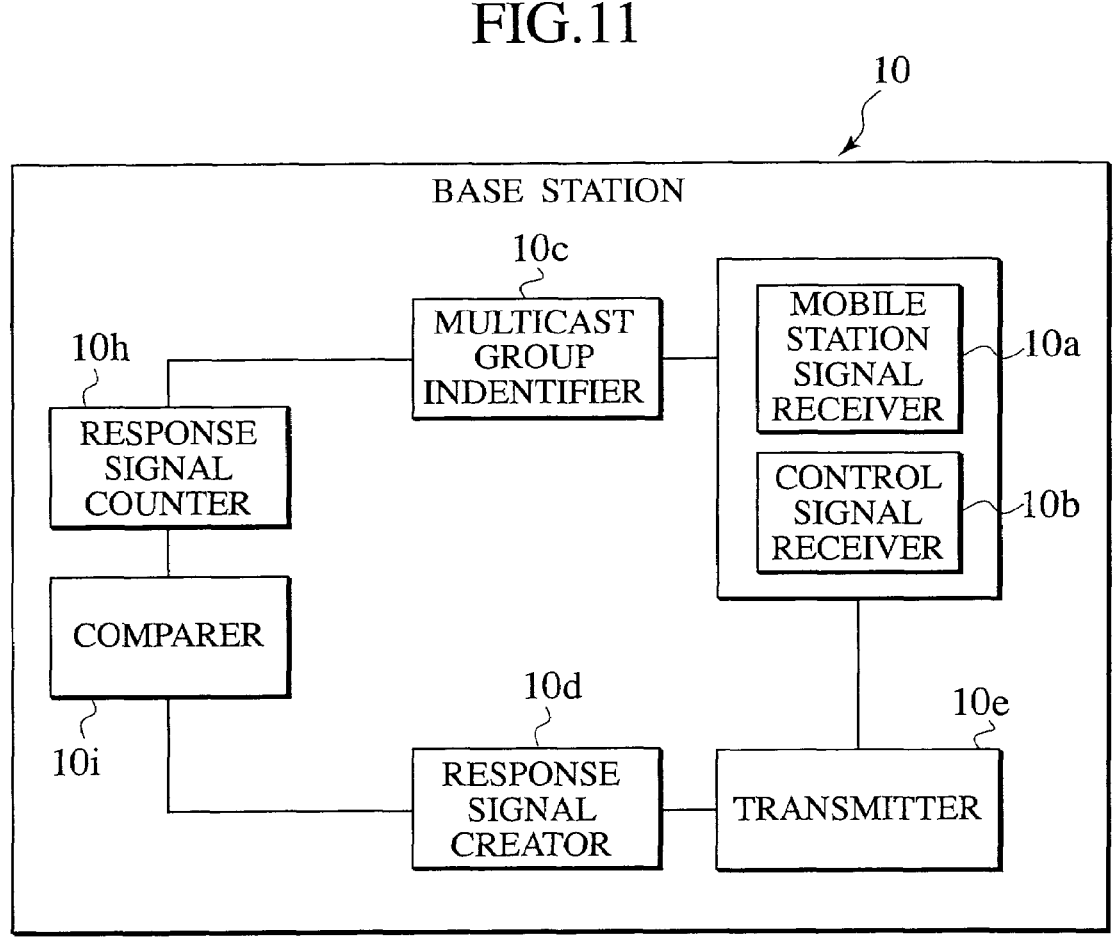
FIG. 11 is a functional block diagram of a base station in the radio communication system according to a fourth embodiment.

The present invention is not limited to the above embodiments, and can be applied to a radio communication system according to a fourth embodiment which further comprises a response signal counter 10*h* and a comparer 10*i* as shown in FIG. 11.

The radio communication system according to the fourth embodiment is the same as the radio communication system according to the first embodiment except for the response signal counter 10*h* and the comparer 10*i*. Therefore mainly the difference between both radio communication systems will be explained.

The response signal counter 10*h* is configured to count the number of response signals transmitted from each of the mobile stations 11, 12, 21, 41, 42 and 43 joining in the multicast group A for a predetermined duration.

In the embodiment, three mobile stations 41 to 43 exist under the base station 40, so that the number of response signals (upward direction) to control signals (downward direction) transmitted from the base station 40 can be a value in a range from 0 to 3.

The comparer 10*i* is configured to judge whether the number of response signals transmitted from the mobile stations 11, 12, 21, 41, 42 and 43 joining in the multicast group A is more than a predetermined number (a threshold) for a predetermined duration or not.

For example, when the predetermined number is "2" and the number of response signals transmitted from the mobile stations 11, 12, 21, 41, 42 and 43 joining in the multicast group A is less than or equal to "2", the comparer 10*i* can judge that the response signals should be transmitted to the radio network controller 50, as they are.

When the predetermined number is "3" and the number of response signals transmitted from the mobile stations 11, 12, 21, 41, 42 and 43 joining in the multicast group A is equal to "3", the comparer 10*i* can judge that at least one (for example, two response signals) response signal selected from the three response signals should be transmitted to the radio network controller 50.

The predetermined number (the threshold) can be determined by the base station 10 or the radio network controller 50.

In the embodiment, the response signal creator 10*d* creates, in accordance with the result (comparison result) judged by the comparer 10*i*, at least one response signal to be transmitted to the radio network controller 50.

For example, the response signal creator 10*d* can be configured to transmit the at least one response signal received from the mobile stations to the transmitter 10*e* as they are, as the at least one response signal to be transmitted.

The response signal creator 10*d* can be configured to transmit at least one response signal to the transmitter 10*e*, as the at least one response signal to be transmitted.

<An Operation of the Radio Communication System According to the Fourth Embodiment>

Figure 12:
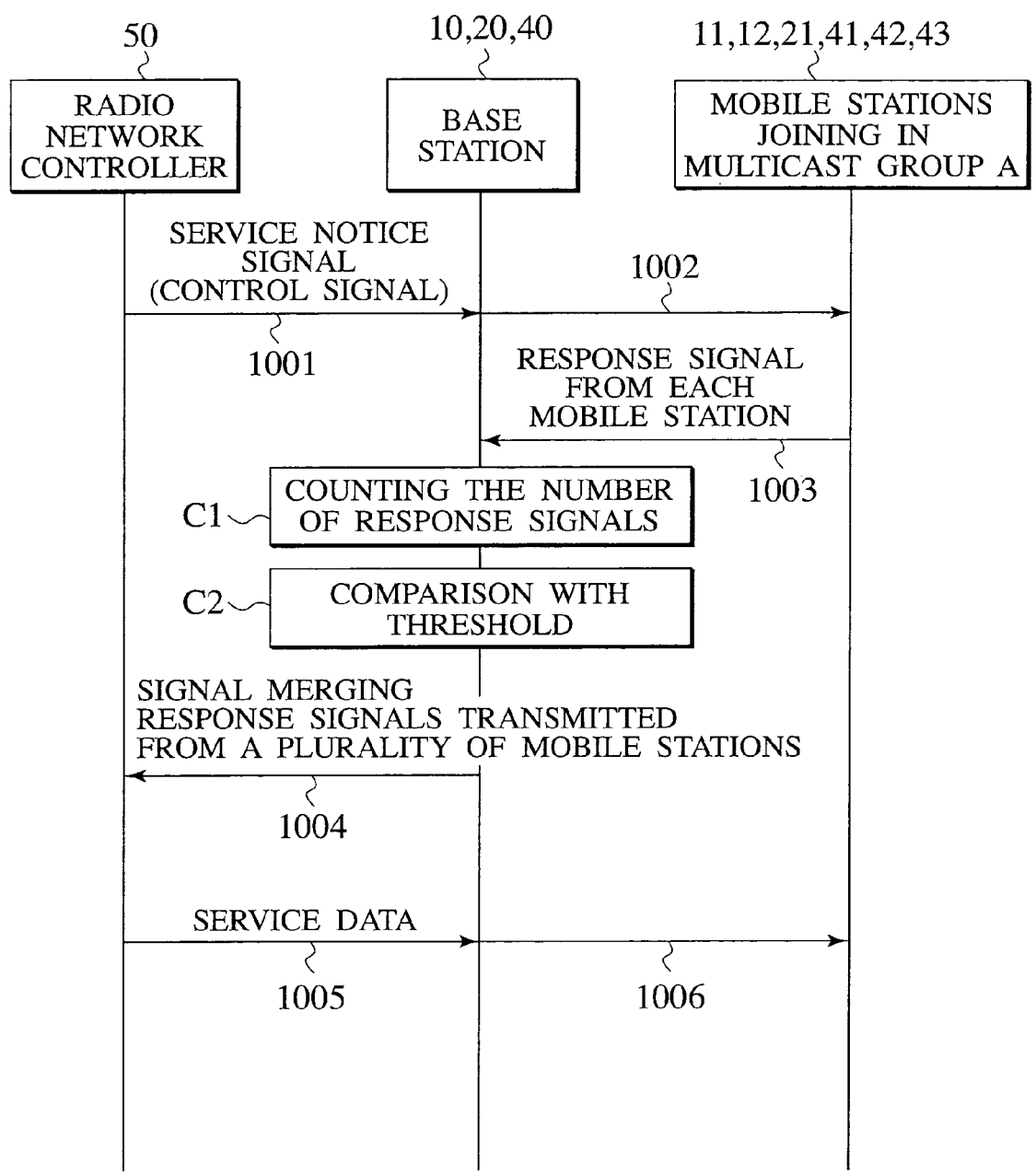
FIG. 12 is a sequence diagram illustrating the operation of the radio communication system according to the fourth embodiment.

Referring to FIG. 12, the operation whereby the radio network controller 50 performs a predetermined processing (for example, a service notice processing) on the mobile stations 11, 12, 21, 41, 42, 43 joining in the multicast group A in the radio communication system according to the embodiment will be described.

As shown in FIG. 12, in step 1001, the radio network controller 50 transmits a control signal such as a service notice signal and an authentication signal to three base stations 10, 20 and 40.

In step 1002, each of the base stations 10, 20 and 40 receives the control signal transmitted from the radio network controller 50. The control signals transmitted by each of the base stations 10, 20 and 40 reach the mobile stations 11, 12, 21, 41, 42 and 43 joining in the multicast group A under the base stations 10, 20 and 40.

In step 1003, each of the mobile stations 11, 12, 21, 41, 42 and 43 creates a response signal including a group ID. It is thus possible to identify that each of the mobile stations 11, 12, 21, 41, 42 and 43 is joining in the multicast group A with the group ID. Each of the mobile stations 11, 12, 21, 41, 42 and 43 respectively transmits the created response signal to the base stations 10, 20 and 40.

In step C1, each of the base stations 10, 20 and 40 counts the number of response signals transmitted from each of the mobile stations 11, 12, 21, 41, 42 and 43 joining in the multicast group A for a predetermined duration.

In step C2, each of the base stations 10, 20 and 40 judges whether the number of response signals transmitted from the mobile stations 11, 12, 21, 41, 42 and 43 joining in the multicast group A is more than a predetermined number (a threshold) or not.

When the counted number of response signals is less than or equal to the predetermined number, each of the base stations 10, 20 and 40 transmits the at least one received response signal to the radio network controller 50 as they are, in step 1004.

On the other hand, when the counted number of response signals is more than the predetermined number, each of the base stations 10, 20 and 40 transmits at least one response signal selected from at least one response signal to the radio network controller 50, in step 1004.

In the embodiment, the base station 10 selects at least one response signal transmitted from the mobile station 11 for transmission to the radio network controller 50, the base station 20 selects at least one response signal transmitted from the mobile station 21 for transmission to the radio network controller 50, the base station 40 selects at least one response signal transmitted from the mobile station 41 for transmission to the radio network controller 50.

In step 1005, the radio network controller 50 transmits service data to the base stations 10, 20 and 40 in accordance with the at least one response signal transmitted from each of the mobile stations 11, 21 and 41. In other words, the radio network controller 50 performs delivery controlling in accordance with the at least one response signals transmitted from each of the mobile stations 11, 21 and 41.

In step 1006, each of the base stations 10, 20 and 40 transmits the received service data to each of the mobile stations 11, 12, 21, 41, 42 and 43.

<A Configuration of a Radio Communication System According to a Fifth Embodiment of the Present Invention>

Figure 13:
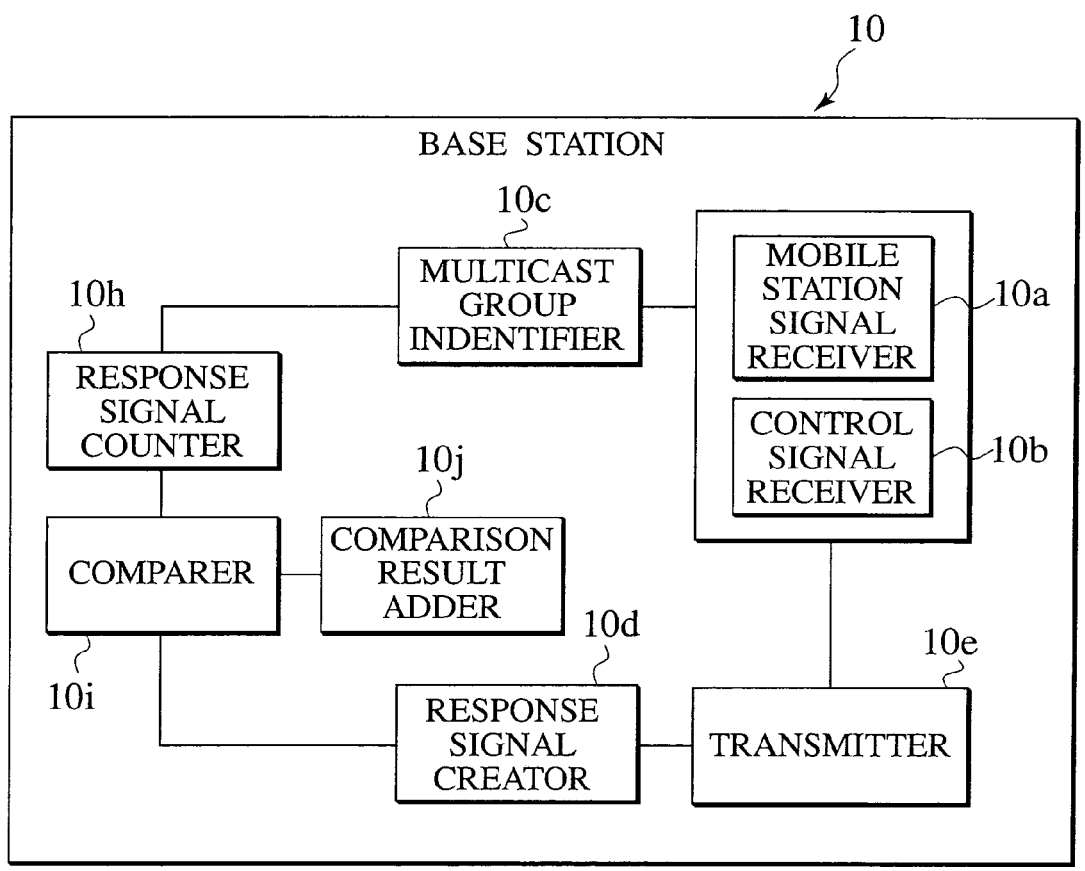
FIG. 13 is a functional block diagram of a base station in the radio communication system according to a fifth embodiment.

The present invention is not limited to the above embodiments, and can be applied to a radio communication system according to a fifth embodiment which further comprises a response signal counter 10*h*, a comparer 10*i* and a comparison result adder 10*j* as shown in FIG. 13.

The radio communication system according to the fifth embodiment is the same as the radio communication system according to the fourth embodiment except for the comparison result adder 10*j* and the configuration of the radio network controller 50. Therefore mainly the difference between both radio communication systems will be explained.

The comparison result adder 10*j* is configured to instruct the response signal creator 10*d* to notify information showing the comparison result acquired by the comparer 10*i*, that is, information showing the result of judging whether the number of response signals transmitted from the mobile stations 11, 12, 21, 41, 42 and 43 joining in the multicast group A is more than a predetermined number (a threshold) for a predetermined duration or not, to the radio network controller 50 together with the response signals.

For example, the response signal creator 10*d* creates at least one response signal including information showing that the counted number of response signals is more than the predetermined number or information showing that the counted number of response signals is not more than the predetermined number, in accordance with the instruction from the comparison result adder 10*j*.

The response signal creator 10*d* can create, in accordance with the instruction from the comparison result adder 10*j*, at least one response signal including the counted number of response signals.

Figure 14:
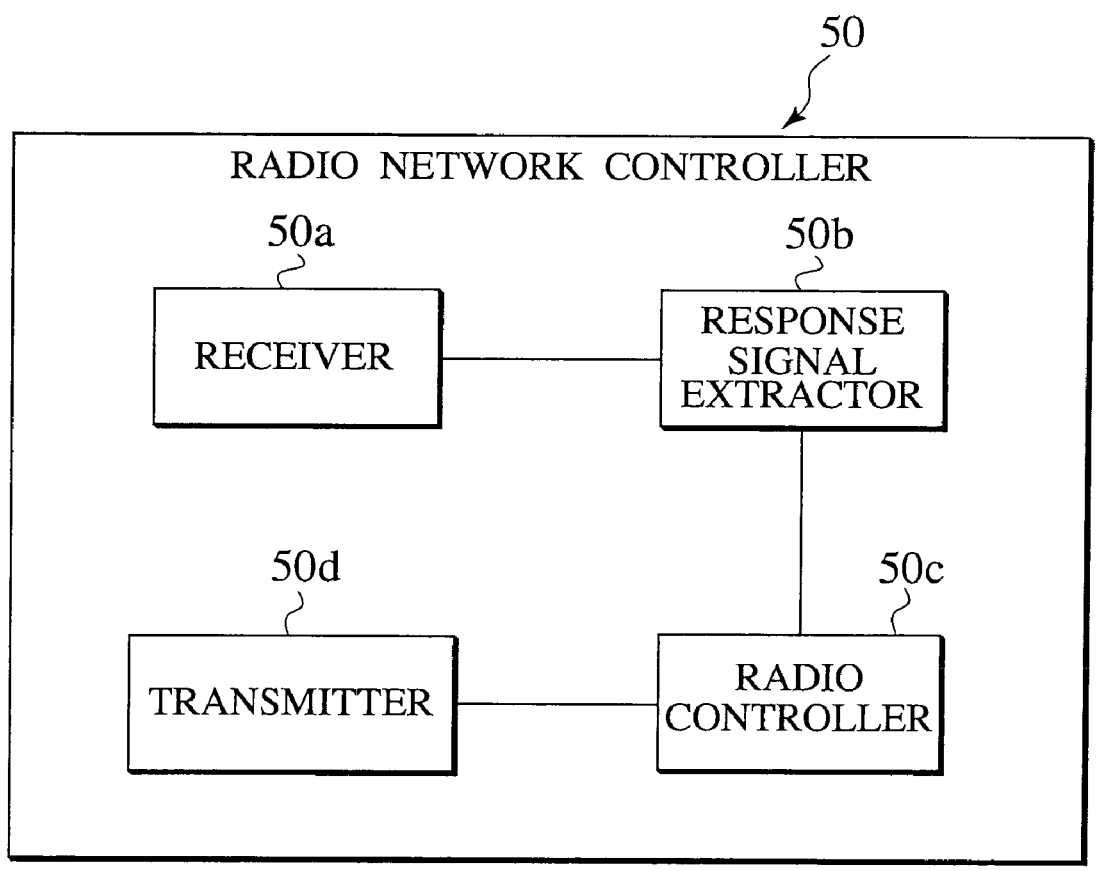
FIG. 14 is a functional block diagram of a radio network controller in the radio communication system according to the fifth embodiment.

As shown in FIG. 14, the radio network controller 50 is configured with a receiver 50a, a response signal extractor 50b, a radio controller 50c and a transmitter 50d.

The receiver 50a is configured to receive the response signals transmitted from each of the base stations 10 to 40.

The response signal extractor 50b is configured to extract the information showing that the counted number of response signals is more than the predetermined number, or the counted number of response signals, from the response signals received by the receiver 50a.

The radio controller 50c is configured to perform a radio controlling in multicast communication, in accordance with the extracted information or the extracted number of response signals.

For example, the radio controller 50c can be configured to perform delivery controlling on the plurality of mobile stations joining in the multicast group A, using common circuits, when the signal merging the response signals received from the mobile stations joining in the multicast group A into one is transmitted, that is, when the information showing that the number of response signals is more than the predetermined number is extracted from the received response signal.

On the other hand, the radio controller 50c can be configured to perform delivery controlling on the plurality of mobile stations joining in the multicast group A, using each individual circuit, when the response signals received from the mobile stations joining in the multicast group A is transmitted respectively, that is, when the information showing that the number of response signals is more than the predetermined number is not extracted from the received response signal.

The present invention can provide a base station, a mobile station, a base station and a radio network controller used in a radio communication system which can reduce the load on the radio network controller during the multicast communication.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio communication system performing multicast communication, wherein mobile stations each comprise a response signal transmitter configured to transmit a response signal including a group ID identifying a multicast group to a base station, the response signal transmitted from each of the mobile stations in response to a control signal for multicast group; and a base station comprises:

a response signal counter configured to count a number of response signals including a same group ID identifying a same multicast group;

a judger configured to judge whether a counted number of response signals exceeds a configurable predetermined number that is a configurable variable; and a response signal transmitter configured to transmit a single response signal including information that the counted number of response signals exceeds the configurable predetermined number, or the counted number of response signals, when the counted number of response signals exceeds the configurable predetermined number.

2. The system of claim 1, wherein the judger is further configured to judge whether the counted number of response signals exceeds the configurable predetermined number for more than a predetermined duration.

3. A base station supporting multicast communication, the base station comprising:

a response signal counter configured to count a number of response signals including a same group ID identifying a same multicast group, which are transmitted from mobile stations in response to a control signal for the same multicast group;

a judger configured to judge whether a counted number of response signals exceeds a configurable predetermined number that is a configurable variable; and a response signal transmitter configured to transmit a single response signal including information that the counted number of response signals exceeds the configurable predetermined number, or the counted number of response signals, when the counted number of response signals exceeds the configurable predetermined number.

4. The base station according to claim 3, further comprising a detector configured to detect a reception of a detected response signal transmitted from any one of the mobile stations; and wherein a response signal holder holds the detected response signal for a predetermined duration after the reception of the detected response signal.

5. The base station according to claim 3, wherein the response signal transmitter is configured to transmit the response signals transmitted from the mobile stations, instead of transmitting the single response signal, when the counted number of response signals does not exceed the configurable predetermined number.

6. The base station of claim 3, wherein the judger is further configured to judge whether the counted number of response signals exceeds the configurable predetermined number for more than a predetermined duration.

7. A radio network controller supporting multicast communication, the radio network controller comprising:

a receiver configured to receive a single response signal transmitted from at least one base station, the single response signal including a same group ID identifying a same multicast group to which mobile stations are requesting to join and including information that a counted number of response signals transmitted from the mobile stations exceeds a configurable predetermined number that is a configurable variable;

an extractor configured to extract a counted number of response signals from the single response signal; and a radio controller configured to perform delivery control on the mobile stations joining in the same multicast group using a common circuit common to the mobile stations when the counted number of response signals exceeds the configurable predetermined number, and to perform delivery control using respective individual circuits of the mobile stations when the counted number of response signals is not extracted from the single response signal.

8. A radio network controller supporting multicast communication, the radio network controller comprising:

a receiver configured to receive a single response signal transmitted from at least one base station, the single response signal including a same group ID identifying a same multicast group to which mobile stations are requesting to join, and including a counted number of response signals;

an extractor configured to extract the counted number of response signals from the single response signal; and a radio controller configured to perform delivery control on the mobile stations joining in the same multicast group using a common circuit common to the mobile stations when the counted number of response signals exceeds a configurable predetermined number that is a configurable variable, and to perform delivery control using respective individual circuits of the mobile stations when the counted number of response signals is not extracted from the single response signal.

* * * * *